United States Patent [19]

Freese

[11] 4,004,607
[45] Jan. 25, 1977

[54] CONDUIT ARRANGEMENT WITH PROTECTION AGAINST RUPTURE AND LEAKAGE

[76] Inventor: Lennart Werner Freese, Stalringen 20, 175 74 Jarfalla, Sweden

[22] Filed: Oct. 20, 1975

[21] Appl. No.: 623,712

[30] Foreign Application Priority Data

Oct. 28, 1974 Sweden .............................. 7413556
Aug. 19, 1975 Sweden .............................. 7509247

[52] U.S. Cl. ................................. 137/486; 137/498; 137/502; 137/460
[51] Int. Cl.² ......................................... F16K 31/12
[58] Field of Search ............ 137/460, 486, 498, 502

[56] References Cited

UNITED STATES PATENTS

| | | | |
|---|---|---|---|
| 2,445,612 | 7/1948 | Faushier | 137/460 |
| 2,566,773 | 9/1951 | Otis | 137/486 |
| 2,566,775 | 9/1951 | Otis | 137/486 |
| 3,441,052 | 4/1969 | Schilling | 137/498 X |

*Primary Examiner*—Harold W. Weakley
*Attorney, Agent, or Firm*—Woodhams, Blanchard and Flynn

[57] ABSTRACT

A conduit arrangement for heavy duty purposes in which a conduit section, such as a length of flexible hose, may be subjected in use to high stresses from pressures attaining several hundred atmospheres, wherein the arrangement provides protection against ruptures and significant leaks and comprises stop valve means at the inlet end of the conduit section, pressure drop type flow sensing means (e.g. an orifice plate or venturi restriction) at the outlet of said section, and pressure comparator means for comparing the pressure drop over the flow sensing means with that over the stop valve means and operative to effect a rapid closing operation of the stop valve means if the ratio of said pressure drops deviates by a certain amount from a predetermined value.

9 Claims, 4 Drawing Figures

CONDUIT ARRANGEMENT WITH PROTECTION AGAINST RUPTURE AND LEAKAGE

The present invention relates to protective devices for systems conducting fluid, e.g. hydraulic systems, especially a so-called hose rupture valve, intended to come into operation on the occurrence of a rupture in a hose or conduit incorporated in the system but also when there is noticeable leakage in such a member.

Hose rupture valves are used for example in hydraulic excavating, lifting and loading machines, and have the primary task of preventing the implement hydraulically operated by the machine, e.g. a digging bucket, suddenly falling down if one of the hoses through which high pressure oil is taken to and from the hydraulic cylinder or cylinders of the implement happens to break when the implement is in a raised position. Such an incident can obviously have catastrophal consequences and represents an obvious risk in all working machines and apparatues of the kind in question.

To avoid such accidents the said hose rupture valves are used, and are placed immediately adjacent the outlet from the hydraulic cylinder or cylinders which are in operation, i.e. before the high pressure hose connecting the cylinder or cylinders to the operating valve of the machine and the main tank or sump. A known such hose rupture valve may be described as a "reversed" non-return valve or check valve, the valve body of which is spring biased to the open position, thus allowing free flow through the valve in both directions. If, however, the rate of flow through the valve, more particularly from the cylinder and through the return hose to the operating valve, exceeds a certain selected value, which happens when a hose rupture occurs at high return pressure, the spring and valve element action is so adjusted that the valve element is carried by the flow of liquid to overcome the spring pressure and close the valve. The outlet from the cylinder is hereby blocked and the movement of the working implement is arrested.

A difficult drawback with this and similar types of hose rupture valves is, however, that blocking can occur at undesired occasions, e.g. when the working implement is quickly lowered during the normal operation of the machine. The critical rate of flow through the valve can namely not be chosen so high as to avoid such unintentional stoppages completely, otherwise the falling speed of the implement as a result of a possible hose rupture would be unacceptably high before the implement was stopped.

The invention thus has the object of providing a safety valve of the kind in question, in which the above-mentioned drawbacks have been circumvented by the valve having been provided with control means preventing it in all conditions from blocking the fluid flowing through during normal operation, but causing the valve to close at the moment, and only at the moment, when a hose rupture of a severe leak really occurs, so that the valve can stop the flow from the cylinder or cylinders in question.

Some embodiments of the invention will now be described for the purpose of exemplification while referring to the attached drawings, in which FIG. 1 is a schematic illustration of a safety valve device according to the invention;

Figure 1:
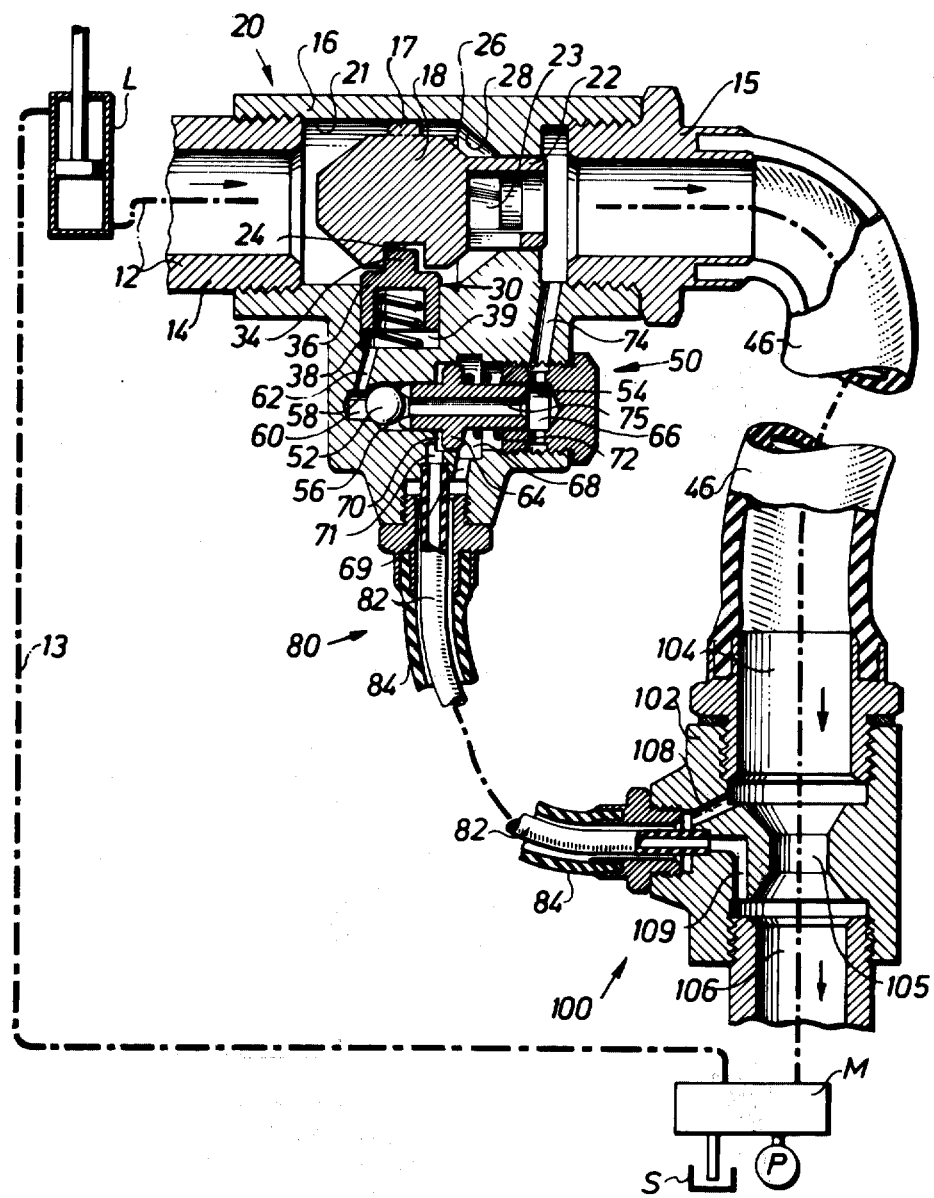

Thus FIG. 1 shows a conduit section monitored according to the invention, in this case part of a liquid carrying system, the section consisting, for example, of a flexible hose 46 which may be incorporated in the hydraulic connection between, for example, a double acting lifting cylinder L of a loading machine and a coacting operating valve M. On one side the latter is in communication with the lifting cylinder through a supply conduit 13 and a return conduit 12, and on the other side with a hydraulic pressure source, e.g. a pump P and a sump S. The flexible conduit or hose 46 is coupled into the return conduit 12 and a blocking valve 20 is arranged according to the principles of the invention at the inlet end of the hose 46. The blocking valve 20 comprises a valve housing 16 with inlet and outlet unions 14 and 15, respectively, and a through duct 21 in which a valve body 18 is axially movable. The valve body is guided partly by fins 17 arranged around the circumference of the body and sliding against the walls of duct 21, and partly by a cylindrical guide boss 22 slidingly accomodated in an opening in a recessed portion of the valve housing provided with a valve seat 28. The guide boss 22 is provided with recesses 23 so that in the open position as in FIG. 1 liquid can flow freely past the valve body 18 and into the hose 46 through the openings or recesses 23 in the guide boss 22. As may be seen in FIG. 1, the valve body 18 is made with a conical valve surface 26 at its right-hand end, intended to coact with the valve seat 28 for valve closure.

The blocking valve 20 is forcably kept in its shown open position with the aid of a latching means 30, which in its simplest form comprises a latching piston 36 accomodated in a cylindrical chamber 39 in the valve housing 16. The latching piston 36 is provided with a projecting latching tongue 34 arranged for engagement with a slot or recess 24 in the valve body 18 as shown in FIG. 1, the latching piston 36 being urged by a spring 38 into its shown latching position. The latching means 30 is controlled by a flow sensing means 100 at the outlet end of the hose 46, although not directly by this means but indirectly via a flow rate servo safety pilot valve 50, hereinafter referred to as a pilot valve.

The pilot valve 50 (see FIG. 2) is accomodated in the housing 16 of the blocking valve 20 and consists of a valve ball 52 coacting with a pilot valve slide 54 in the form of a small movable piston. The valve ball 52 is accomodated in a cylindrical chamber 56 and is arranged to seal against a seating 58, the effective sealing diameter $d_1$ of which is generally in agreement with the diameter of a chamber 60, adjacent the seating. Via a duct 62 the chamber 60 is in communication with the chamber 39 under the latching piston 36. The pilot valve slide 54 is made with a generally central shoulder 64 while the rest of the slide to the left and right of this shoulder forms projecting necks 63 and 65, respectively, with the same diameter $d_2$, in agreement with the diameter of the chamber 56 accomodating the ball 52. The left neck 65, on the drawing, of the pilot valve slide is slidably accomodated in this chamber 56, while the right neck 63 of the slide is slidably accomodated in a chamber 66, for example made in a plug 67 screwed into the valve housing 16, for sealing off the pilot slide valve system from outside.

The cylindrical shoulder 64 of the pilot valve slide 54 has an outside diameter $d_3$ and is accomodated in a chamber 68 having a larger diameter, but can be displaced leftwards by a spring 72 into a chamber 70 with the same nominal diameter $d_3$, in which the shoulder glides while sealingly engaging the outer chamber wall. The chambers 56 and 66 with the same diameter $d_2$ are commonly in communication via a through duct 75 in the pilot valve slide 54 and castellations 76 in the left-hand end of the slide, i.e. in the end of the pilot valve slide neck 65. By means of radial ducts or castellations in the plug 67 and a duct 74 in the housing 16, the chamber 66 is further in communication with the outlet from the blocking valve, see FIG. 1.

The flow sensing means or flow sensor 100 arranged at the outlet end of the hose 46 lacks moving parts and comprises an orifice plate or a venturi constriction 105 for creating, in a manner known per se, a pressure signal related to the volume flowing past. The flow sensor 100 comprises a housing 102 accomodating a through duct with inlet 104 and outlet 106 between which the constriction 105 is arranged. The pressure in the inlet 104, i.e. on the inlet side of the constriction 105, is sensed via a duct 108 in the housing 102, while pressure in the outlet 106 is sensed via a duct 109. By means of a flexible double hose 80, consisting of an inner hose 82 arranged inside an outer hose 84, the flow sensor 100 is in communication with the blocking valve 20, the inner hose 82 being connected with the duct 109 and the outer hose 84 with the duct 108. The pressure drop occurring between the inlet and outlet sides of the venturi constriction 105 is thus transmitted by hoses 84 and 82 to the blocking valve 20, such that the hose 84 communicates with the chamber 68 via a duct 69 in the housing 16, while the hose 82 communicates with the chamber 70 by means of a duct 71.

When the pilot valve 50 is in the initial position shown in FIG. 1, i.e. with the slide 54 in its left-hand end position, the chambers 70 and 68 to the left and right, respectively, of the pilot valve slide shoulder 64 are sealed from each other by the shoulder in this position having slid into the chamber 70 under sealing engagement with the outer wall thereof. From what has just been described with regard to the connections for the flow sensor, it will be seen that in this position of the pilot valve the pressure on the inlet side of the flow sensor 100 acts on the right-hand side of the shoulder 64 through the duct 108, the hose 84, the duct 69 and the chamber 68, while the pressure on the outlet side of the flow sensor is taken through the duct 109, the hose 82, the duct 71 and the chamber 70 onto the left-hand side of the shoulder 64.

The mode of operation for the valve means shown in FIGS. 1 and 2 will now be described, it thereby being first assumed that the hose 46 is intact, i.e. there is no significant leakage between the valve 20 and the flow sensor 100, and the liquid flows without leakage losses from the cylinder L in the direction of the arrows through the hose 46. Due to the flow there is a pressure drop in the blocking valve 20, denoted by $\Delta p_1$, in FIG. 3, which shows the main components of the system arranged after each other and thereunder a pressure diagram expressing the pressure conditions in the system. In the diagram a line A-B-C-D shows how the pressure falls from the inlet of the valve 20 to the outlet of the flow sensor 100. The pressure drop in the flow sensor between the points C and D is denoted by $\Delta p_2$. Since there is no flow through the pilot hose 80 (as has previously been mentioned and as is shown in FIG. 1, communication between both parts 82 and 84 of the pilot hose is broken by the shoulder 64 of the pilot valve slide 54, which in this position separates the chambers 68 and 70 from each other) there is the same pressure in the chamber 68 as in point C, i.e. in the duct 108 of the flow sensor, while pressure in the chamber 70 is the same as pressure in the point D, i.e. in the flow sensor duct 109. The same pressure drop $\Delta p_2$ prevailing across the flow sensor 100 caused by the venturi constriction 105 of the latter, prevails across the pilot valve slide shoulder 64 and causes a force, leftwards in FIG. 1, on the shoulder for the assumed flow direction through the flow sensor. The size of this force, using previously stated diameter denotations will be:

$$F_v = \Delta p_2 \frac{\pi(d_2^2 - d_3^2)}{4} = \Delta p_2 \cdot A_2$$

The ball 52 is actuated on the other side by a rightward force corresponding to the pressure drop over the blocking valve. In the chamber 60 to the left of the ball, this chamber being in communication with the chamber 39 under the latching piston 36 via the duct 62, there thus prevails the same pressure in general as on the inlet side of the blocking valve, while the chamber 56, the pressure in which operates on the right-hand side of the ball 52, is in communication with the outlet of the blocking valve by means of ducts 75 and 74, and since the pressure here is lower, there is a net force on the ball directed to the right. The size of this force can be calculated with knowledge of the effective sealing diameter $d_1$ of the ball seat 58 (see FIG. 2), to be:

$$F_h = \Delta p_1 \frac{\pi d_1^2}{4} = \Delta p_1 \cdot A_1$$

Neglecting the force of the spring 72, the condition for the pilot valve slide 54 remaining in its left-hand position according to FIG. 1, and thereby keeping the ball 52 in sealing seating engagement, i.e. blocking the outlet from the duct 62 and thereby from the chamber 39, is that:

$$F_v > F_h$$

$$\therefore \Delta p_2 \cdot A_2 > \Delta p_1 \cdot A_1, \text{ or } \frac{\Delta p_2}{\Delta p_1} > \frac{A_1}{A_2}$$

If, for example, the area ratio $A_1/A_2 = 1:4$ the venturi constriction or orifice plate 105 must be dimensioned so that $\Delta p_2$ is greater than $0.25 \times \Delta p_1$ for the same flow through the blocking valve and flow sensor. The latching piston 36 is retained with its latching tongue 34 in engagement with the valve body 18 and prevents it from assuming the closing position, because the outlet from the chamber 39 on the lower side of the latching piston is closed.

If the conditions now described prevail for a certain flow through the hose 46 they will also prevail for other flow values since the pressure drops $\Delta p_1$ and $\Delta p_2$, will then vary in the same proportion, i.e. proportionally to the square of the flow.

Figure 3:
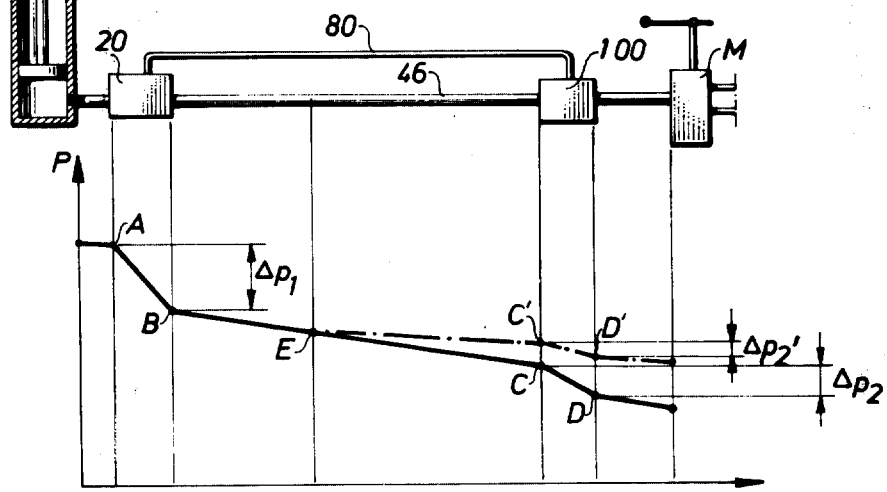
FIG. 3 is a pressure diagram illustrating the pressure relationships within a conduit section of a liquid carrying system monitored by a valve means according to the invention.

On the contrary, if a significant outer leakage were to occur in the hose 46, e.g. at the point denoted by E in FIG. 3, the pressure drop will be diminished both in the hose after this point and in the flow sensor due to the smaller flow through the latter. The pressure graph then changes to the one shown as an example in FIG. 3 and denoted by A-B-E-C'-D'; the pressure drop C'-D' being denoted $\Delta p_2'$. If the flow falls, e.g. by about 30 %, that is to say to 70 % of the flow through the valve 20 at the inlet of the hose, then:

$$\Delta p_2' \sim 0.5 \Delta p_2$$

For a suitable diameter ratio $d_3:d_1$, the following will apply in this case:

$$F_v' < F_h$$

Figure 2:
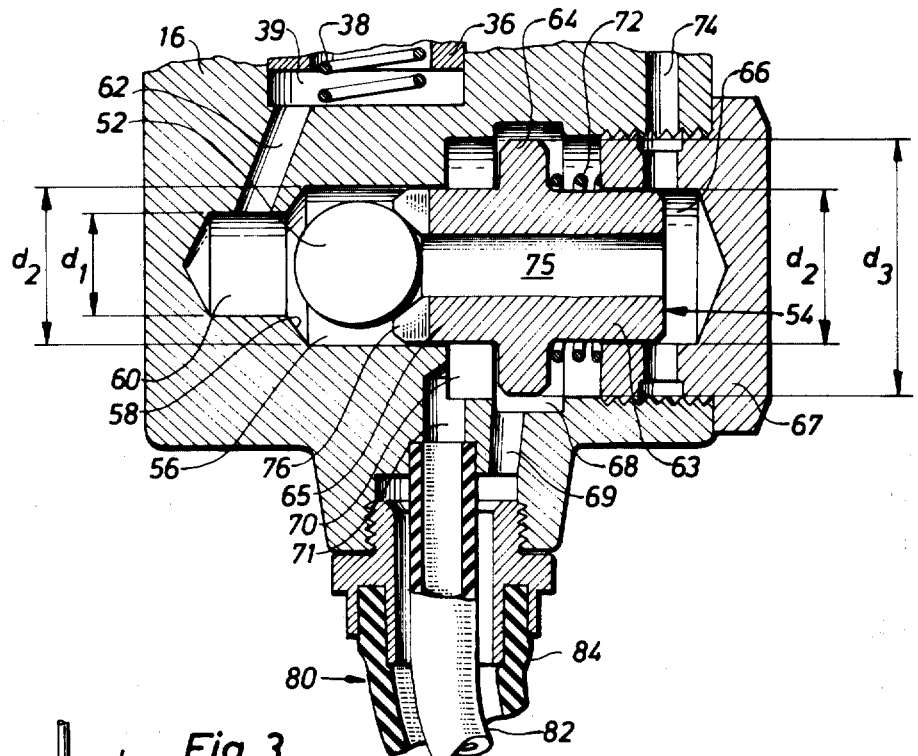
FIG. 2 is a detail view to a larger scale of a portion of FIG. 1.

The ball 52 and the pilot valve slide 54 are thereby displaced to the right, see FIG. 2, for allowing the liquid to flow from the duct 62 past the ball 52 into the chamber 56, further through the castellations 76, the duct 75, the chamber 66 and the chamber 74 to the outlet of the valve 20. Because of the pressure difference arising between the upper and lower sides of the latching piston 36, the piston is pressed downwards and releases the valve body 18 which is then immediately entrained by the flow to the right and closes the outlet of the valve, i.e. blocks the flow from the cylinder L.

The same thing naturally occurs for an even greater leak in the hose 46, or if this should be ruptured completely. In the latter case the pressure drop over the flow sensor 100 sinks to zero, i.e. $\Delta p_2 = 0$.

The described valve means thus serves as a monitor allowing the fluid to flow freely as long as the monitored conduit section is intact (in this case the hose 46) but automatically and immediately arresting flow to the section as soon as noticeable leakage occurs.

If flow takes place in the opposite direction, i.e. against the direction of the arrows shown in FIG. 1, the pressure drop will occur in the opposite direction to that shown in FIG. 3. The pilot valve slide 54 will thereby be displaced towards the right, as seen in the figures, and the recently mentioned communication between the chamber 39 under the latching piston 36 and the blocking valve outlet is thus established. If a hose rupture or heavy leakage should occur in the hose or its unions and the liquid flow to the lifting cylinder L turns and rushes out from the cylinder, the latching piston can thus immediately be pressed out of the way and the valve body 18 can go to engagement against its seat 28 and block the flow from the cylinder.

Under normal conditions, for a flow direction towards the cylinder L, a secondary flow arises through the pilot hose 80 due to the pilot valve slide 54 being displaced to the right as mentioned. As may be especially appreciated from FIG. 2, communication is hereby open between the chambers 70 and 68, for which reason the pressure drop over the flow sensor causes a certain flow from the duct 109 of the flow sensor, the inner hose 82, the chambers 70 and 68 and back again through the outer hose 84 to the flow sensor duct 108, which means that as the oil in the pilot hose is thus continually circulated, its temperature is kept from dropping. This is advantageous, e.g. during severe cold weather with a large distance between the blocking valve and the flow sensor, when the temperature of the oil in the pilot hose needs to be as high as possible so that the system reaction time will be satisfactorily short. Since both the components of the pilot hose are arranged one inside the other, only the outer of them needs to be dimensioned for the full system pressure, which for oil hydraulic systems can attain several hundred atmospheres, while the inner hose only needs to be dimensioned for the pressure difference $\Delta p_2$ in the flow sensor, i.e. at most about 10 atmospheres. In this way the pilot hose system will be considerably cheaper and simpler to install as well as less bulky than if two separate hoses were used.

In FIG. 1 is shown how the chamber 39 under the latching piston 36 between the pilot valve 50 can be put into communication with the outlet side of the blocking valve 20 and the lower pressure prevailing there. But it is also possible to lead off the pressure in the said chamber 39 to a point at or near the inlet of the flow sensing means 100, i.e. the outlet from the hose 46. In this case the pressure is led off through the pilot connection hose 80, and the pilot valve with its ball valve 52, 58 is built together with the flow sensor 100 analogously with the shown combination with the blocking valve 20. It is also pointed out that the shown stop valve in the form of a ball 52 sealing against a seat 58 can naturally be replaced by other like means, e.g. the valve slide 54 can be extended with a suitable portion which in co-action with the port openings forms a stop valve with the same function as the shown ball valve.

Figure 4:
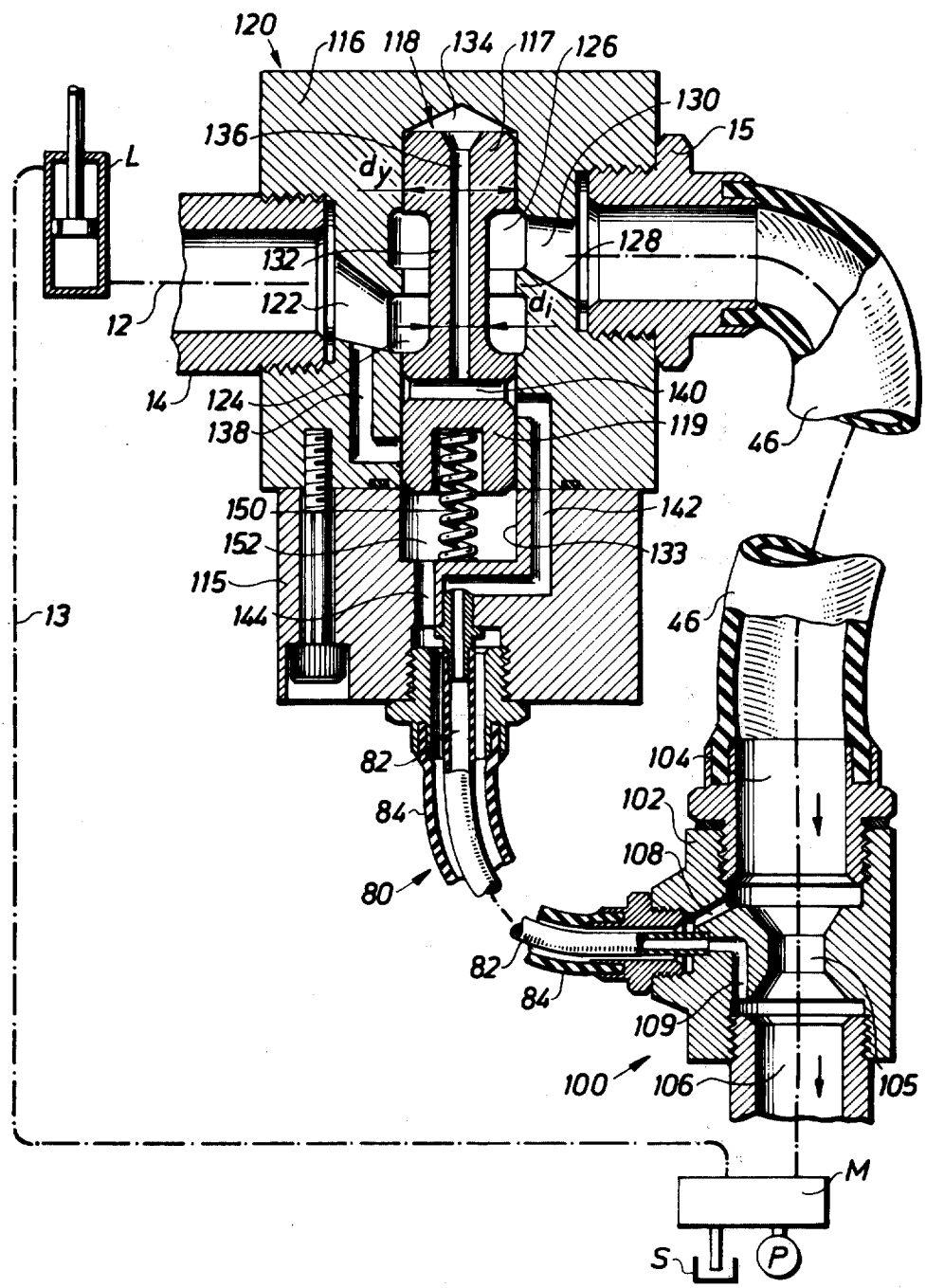
FIG. 4 is a view corresponding to FIG. 1 and shows a modified embodiment of a blocking valve or stop valve incorporated in a valve means according to the invention.

The modified valve means according to the invention and shown in FIG. 4 also includes a blocking valve 120 and a flow sensing means 100 arranged, respectively, at the inlet to and outlet from the monitored conduit section, which is for example a hose 46 as before. In this case the blocking valve consists of a valve housing 116 provided with a cover portion 115 with inlet and outlet unions 14 and 15, a valve body in the form of a spool 118 being slidably received in a cylindrical bore 133 generally transverse in relation to the inlet and outlet. A light pressure spring 150 is provided to keep the spool normally in an upper position, as seen in FIG. 1, thereby allowing free flow through the valve, which will be apparent from the following.

In this embodiment of the invention the valve spool 118 is arranged to serve not only as a blocking valve, but also as the necessary pressure comparator means, and for this purpose the spool is provided with the following additional features. In the first place, the spool is separated by a reduced portion or waist 132 into upper and lower cylindrical end portions 117 and 119, respectively. In the second place the spool itself separates the bore into chambers, to wit; upper and lower end chambers 134 and 152, respectively (of which the lower is in the cover portion 115), and central chambers 124 and 126 about the waist portion 132 of the valve spool, said chambers having somewhat larger diameter that the bore 133 and being separated by a narrow shoulder 128 having the same nominal diameter as the bore. Of these chambers, 124 is in direct communication with the valve inlet port or union 14 by means of a duct 122, while the chamber 126 is in communication via a duct 130 with the outlet port or union 15. The spool 118 is further provided with a central duct 136 which keeps the upper chamber 134 in communication with a cross duct 140 in the spool below the waist portion 132 thereof, for a purpose shortly to be described. In the shown normal position or initial position, the valve spool 118 is thus kept in its upper position by the spring 150 and there is a free flow passage in the valve 120 from the inlet 14 to the outlet 15.

The flow sensing means or sensor 100 is completely identical with that shown in the valve means according to FIG. 1 and which has previously been described. Between the inlet and outlet side of the sensor there will thus be a pressure drop, transferred by the double hose 80 to the blocking valve 120, in this case so that the outer hose 84 of the double hose is in connection with the lower chamber 152 of the bore 133 by means of a duct 144 in the cover portion 115 of valve housing 116, while the inner hose 82 is in communication with the transverse duct 140 of the spool 118 by means of a duct 142, and thereby via the central duct 136 of the spool with the upper chamber 134 of the bore 133.

In this case also, see FIG. 4, inlet port 14 of the blocking valve 120 is in communication by means of a supply conduit 12 with a hydraulic working cylinder L, for example incorporated in a hydraulic loading machine or excavator, the valve being connected to one end of the cylinder which forms the outlet during lowering movements. The other end of the cylinder, which thus forms the inlet for lowering movements, is in communication via a return conduit 13 with an opening valve M for the system, this valve also being in communication with the outlet 106 from the flow sensor 100 and thus also with the outlet from the monitored conduit section, i.e. the hose 46.

The mode of operation for the described valve means will now be described, it being pointed out at once that the pressure comparisons made in the following are completely analogous with those made in conjunction with describing the embodiment according to FIG. 1, and with reference to the pressure diagram in FIG. 3, which equally as well illustrates the pressure relationship for the valve means according to FIG. 4.

As already indicated, for normal conditions the valve spool 118 assumes its upper position as in FIG. 4, in which it allows free flow through the valve 120 around its waist portion 132. During the passage of the hydraulic medium through the valve a certain pressure drop occurs across it, primarily through the flow about the waist portion from the lower to the upper of the central chambers 124 and 126 respectively, see FIG. 4, past the shoulder 128 separating the chambers. A higher pressure will thus prevail in the lower chamber 124, corresponding to point A in the pressure diagram according to FIG. 3, than in the upper chamber 126, i.e. at B in the pressure diagram. The pressure drop is denoted $\Delta p_1$, and this obviously creates a downwardly directed force $F_h$ on the valve spool 118 of the magnitude:

$$F_h = \Delta p_1 \frac{\pi(d_y^2 - d_i^2)}{4} = \Delta p_1 \cdot A_1$$

where $A_1$ = the effective area of the spool (see FIG. 4). A pressure drop $\Delta p_2$ simultaneously occurs in the flow sensor 100, the higher pressure, represented by the point C in FIG. 3, being taken via the outer hose 84 of the pilot hose 80 to the chamber 152 at the lower end of the valve spool 118, while the lower pressure, denoted by D in FIG. 3, is taken to the chamber 134 at the upper end of the spool 118 through the inner hose 82 of the pilot hose and the described passage. The pressure drop across the chambers 152 and 134 gives rise to an upwardly directed force $F_v$ on the valve spool 118, of the magnitude:

$$F_v = \Delta p_2 \frac{\pi d_y^2}{4} = \Delta p_2 \cdot A_2$$

The condition for the valve to remain open is thus that:

$$F_v > F_h$$

$$\therefore \Delta p_2 \cdot A_2 > \Delta p_1 \cdot A_1, \text{ or } \frac{\Delta p_2}{\Delta p_1} > \frac{A_1}{A_2}$$

neglecting the effect of the retaining spring 150.

If the orifice plate or constriction 105 of the flow sensor 100 is dimensioned so that this condition is met for certain flow from the cylinder L through the valve 120, the latter will thus remain open even for other volume flows or rates of flow as long as the hose 46 is intact.

If, on the contrary, there is a considerable leakage in the hose 46, e.g. at a point E according to FIG. 3, during the described conditions, i.e. while the cylinder L carries out a sinking movement, the flow through the flow sensor 100 diminishes in relation to the flow through the valve 120, and the pressure graph varies, e.g. as is illustrated by the line A-B-E-C'-D' in FIG. 3. The pressure drop in the flow chamber sinks to $\Delta p_2'$, i.e. the upwardly directed force $F_v$ on the valve spool is reduced to:

$$F_v' = \Delta p_2' \cdot A_2 > F_h$$

whereat the valve spool 118 begins to move downwards as seen in FIG. 4. This movement results in interruption in communication between the transverse duct 140 and the duct 142, instead, the transverse duct comes into communication with a duct 138, which leads directly to the inlet 122 of the valve. The pressure prevailing here, represented by the point A in FIG. 3, is thus taken through the transverse duct 140 and the central duct 136 to the chamber 134 on the upper side of the valve spool 118, so that the spool is exposed to a large downwardly directed force. The downwardly directed movement of the spool is accelerated heavily hereby, resulting in it quickly and positively blocking passage through the valve by its upper end portion 117 sealingly coming in contact with the shoulder 128. The same thing naturally occurs even if the hose ruptures, causing flow through the flow sensor 100 to cease entirely.

For a flow in the opposite direction, i.e. when the cylinder L carries out a lifting movement, the direction of the prevailing pressure drops in the blocking valve 120 and the flow sensor 100 is reversed, which means that the valve spool 118 is kept in the open position by the spring 150, independent of these pressure drops. If, however, the hose 46 should rupture in this position, the flow direction is immediately reversed again and the blocking valve 120 closes analogously to what has been described above.

The mode of operation for the valve means described above thus agrees in principle completely with the method of operation of the device shown in FIG. 1, and similarly both valve means are made with a functionally concurring construction. On the other hand, with regard to the design structure of the blocking valve itself, it is obvious that the valve modified according to FIG. 4 has been simplified to a great degree, both with regard to the number of details incorporated and their method of manufacture as well. This not only means that the modified valve will be considerably simpler and thereby cheaper to manufacture in series production, but also that it will be given greater reliability, especially considering that the risk of functional disturbances caused by impurities in the hydraulic system will be considerably reduced.

The described valve means only represent examples of the practical application of the invention, and this is naturally not limited to these embodiments but can be modified in different respects within the scope of the fundamental inventive idea.

I claim:

1. A valve means for protecting conduit systems against unintentional depressurization, occurring for example when ruptures or leaks arise in the system, the device being applied for monitoring especially exposed sections of the system, e.g. a flexible hose incorporated therein, and arranged automatically to stop or block the flow through such a section for an undesired change in pressure occurring therein, characterized in that a stop or blocking valve (20; 120) is mounted at the inlet of the monitored section (46), said valve normally being open and hereby offering the medium flowing through a modest resistance generating a certain pressure drop ($\Delta p_1$, FIG. 3), while a flow sensing means (100) of the kind wherein a medium flowing through produces a pressure drop ($\Delta p_2$) in response to the size of the flow, and for example comprising an orifice plate or venturi constriction (105), known per se, is placed at the outlet of the section (46), the blocking valve (20; 120) and the flow sensing means (100) communicating with a pressure comparator means (50; 118) which is arranged to compare the pressure drops ($\Delta p_1$ and $\Delta p_2$, respectively) across the blocking valve and the flow sensing means, and operative to cause the blocking valve (20; 120) to close the flow into the conduit section (46) if the ratio ($\Delta p_2/\Delta p_1$) of the pressure drop over the flow sensing means (100) to that over the blocking valve (20; 120) falls below a certain value ($\Delta p_2'/\Delta p_1$).

2. A valve means as claimed in claim 1 in which the blocking valve (20) comprises a housing (16) with an inlet (14), a through passage with a valve seat (28) through which the medium flows, and an outlet (15), there being a movable valve body (18) arranged on the inlet side of the valve seat, the valve body being prevented by a latching means (30) from going into engagement with the seat and closing the valve under the action of the flowing medium, said latching means (30) comprising a movable latching piston (36) slidably accomodated in a cylindrical chamber (39) and arranged to engage the valve body (18) with an extended portion or tongue (34), the piston (36) on its upper side or the side accomodating the tongue (34) being arranged for actuation by the pressure prevailing on the inlet side of the blocking valve (20), while on its underside or side opposite to the tongue it is actuated by the pressure in its chamber (39) and by a spring or retaining means (38) arranged to actuate the piston (36) in a latching direction, characterized in that a conduit communication (64, 75, 74) is arranged from the chamber (39) on the inlet side of the latching piston (36) to the outlet side of the blocking valve, said conduit communication normally being broken by an auxiliary valve (52, 58) incorporated in the pressure comparator means (50) which is arranged, for closing the blocking valve (20), to cause the auxiliary valve (52, 58) to open the said conduit communication, thus causing the pressure in the latching piston chamber to fall to the lower pressure prevailing on the outlet side of the blocking valve, the piston thereby being displaced from its latching engagement with the valve body (18) under the actuation of the higher pressure on its upper side, thereby allowing the valve body to come into engagement with its seat (28).

3. A valve means as claimed in claim 2, characterized in that the pressure comparator means (50) also includes a movable piston slide (54), which on the one hand is exposed to the pressures prevailing on the inlet and outlet sides of the blocking valve (20) by means of the said conduit communication (62, 75, 74) in such a way that the difference ($\Delta p_1$) between these pressures strives to displace the piston slide (54) in one direction and, on the other hand, is exposed by a second conduit communication or pilot hose (80) to the pressures prevailing on the inlet and outlet side (104 and 106, respectively) of the flow sensing means (100) in such a way that the difference ($\Delta p_2$) between these pressures strives to displace the piston slide (54) in the opposite direction, whereby the slide is arranged to actuate its coacting auxiliary valve (52, 58) to open the first-mentioned conduit communication (62, 75, 74) if the said variation in the ratio ($\Delta p_2/\Delta p_1$) of the pressure drops or pressure differences occurs.

4. A valve means as claimed in claim 2, characterized in that the auxiliary valve constitutes a valve ball (52) arranged to be brought into sealing engagement with a seat (58) by the piston slide (54).

5. A valve means as claimed in claim 1, in which the blocking valve (120) comprises a housing (115, 116) with an inlet (14, 122), a through passage (124, 126), and an outlet (130, 15), there being a slide means (118) arranged in the through passage of the valve, said slide means being movable between an open position in which the medium is allowed free flow through the valve, and a closing position in which flow of the medium through the valve is blocked, characterized in that the slide means (18) simultaneously constitutes the pressure comparator means in being arranged to be exposed, on the one hand, to the pressures prevailing at the inlet and outlet sides of the blocking valve (120) in such a way that the difference ($\Delta p_1$) between these pressures strives to displace the sliding means in one direction and, on the other hand, to the pressures prevailing on the inlet and outlet sides (104 and 106, respectively) of the flow sensing means (100) in such a way that the difference ($\Delta p_2$) between these two pressures strives to displace the slide means (118) in the opposite direction, the slide means being arranged to move to its closing position for blocking the flow through the valve if the said variation in the ratio ($\Delta p_2/\Delta p_1$) of the pressure drops or pressure differences occurs.

6. A valve device as claimed in claim 5, characterized in that the slide means constitutes a cylindrical spool (118) which is slidably accomodated in a bore (133) in the valve housing (116) and is made with two end portions (117, 119) united by a reduced or waisted portion (132), arranged for being flowed past by the medium on its way from the inlet (14, 122) to the outlet (130, 15) of the valve housing (116) in such a way that the pressure drop ($\Delta p_1$) prevailing hereby across the net area of the spool at the waisted portion actuates the spool in said one direction, while the end portions (119, 117) at the ends of the spool form the limits of chambers (152 and 134, respectively) in the bore (133), said chambers being in communication with the inlet side and outlet side, respectively, of the flow sensing means (100) in such a way that the pressure drop ($\Delta p_2$) occurring over said means actuates the spool in the opposite direction.

7. A valve means as claimed in claim 6, characterized in that the spool (118) is arranged to break the connection between the outlet side (106) of the flow sensing means and coacting chamber (134) in the bore (133) on initiation of its closing movement, to put said chamber (134) in direct communication with the inlet (122) of the blocking valve (120) instead.

8. A valve means as claimed in claim 7, characterized in that the said communication between the outlet side (106) of the flow sensing means (100) and the coacting chamber (134) comprises longitudinal and transverse ducts (136 and 140, respectively) in the spool (118), and also comprises a duct (132) arranged in the valve housing (115, 116), normally communicating with the transverse duct (140), which, however, is arranged to come into communication with another duct (138) in the housing upon said initiation of the spool closing movement, said last mentioned duct (138) leading directly to the inlet (122) of the blocking valve (120), thereby amplifying the pressure acting in the closing direction on the spool by the inlet pressure in the blocking valve.

9. A valve means as claimed in claim 1, characterized in that the pressure drop ($\Delta p_2$) over the flow sensing means (100) is transferred to the pressure comparator means (50; 118) by the aid of a pilot hose (80) comprising double hoses, which communicate with each its side of the flow sensing means and of which the one (82) is arranged inside the other (84).

* * * * *